Jan. 2, 1923.

E. V. ESPENHAHN.
GAS PURIFICATION PROCESS.
FILED FEB. 9, 1921.

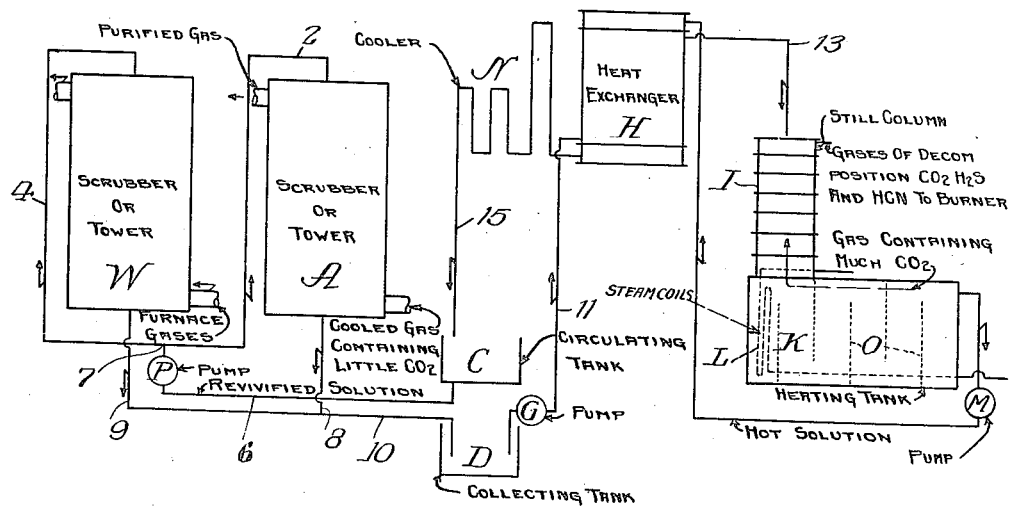

Patented Jan. 2, 1923.

1,440,977

UNITED STATES PATENT OFFICE.

EDWARD VICTOR ESPENHAHN, OF EAST ORANGE, NEW JERSEY, ASSIGNOR TO THE KOPPERS COMPANY, OF PITTSBURGH, PENNSYLVANIA, A CORPORATION OF PENNSYLVANIA.

GAS-PURIFICATION PROCESS.

Application filed February 9, 1921. Serial No. 443,498.

*To all whom it may concern:*

Be it known that I, EDWARD VICTOR ESPENHAHN, a subject of the King of England and a citizen of the Commonwealth of Australia, residing in East Orange, in the county of Essex and State of New Jersey, have invented a new and useful Improvement in Gas-Purification Processes, of which the following is a specification.

This invention relates to the treatment of fuel gases, such for example as coke oven gas, retort coal gas, water gas, or gas derived from the distillation of petroleum; the invention has for an object to effect an efficient purification of such gases, by the absorption and removal therefrom of such constituents as carbon dioxide, sulphur, for example as hydrogen sulphide, and cyanogen bearing compounds, whether all or only one or more of these constituents are present in the gas to be purified. The invention also provides a complete regeneration of the gas purifying agent, after such agent has absorbed the impurities from the gas, the regeneration causing the foul purifying agent to expel the absorbed impurities so that they may be recovered and utilized industrially, while the regenerated purifying agent may be returned to the gas purification operation and used for further absorption of impurities from the gas. This process has the advantage of effecting the regeneration of the purifying agent without the formation of inert compounds which are useless for subsequent gas treatment and would therefore result in waste of the purifying agent; consequently, the process comprehends a practically complete conservation of the purifying agent, inasmuch as substantially the same volume of the purifying agent may be used over and over again with satisfactory results.

The elimination of sulphur impurities from fuel gases is a great advantage. The presence of sulphur compounds in fuel gases is obnoxious, especially when the gas is consumed and, to avoid this, it has heretofore been a common practice to pass the fuel gas through boxes containing quantities of iron oxide before allowing the gas to flow into the supply mains. While iron oxide functions to absorb these deleterious compounds from the gas, the iron oxide boxes have to be cleaned frequently and replenished and consequently are expensive to maintain. By the use of the present invention, the quantity of iron oxide necessary to insure purification of the gas is reduced to a minimum, inasmuch as the improved purification process removes from the gas substantially all of the sulphur compounds, as well as other industrially valuable substances hereinabove mentioned, before the gas is allowed to pass into any iron oxide boxes on its way to the supply mains.

In addition to the general objects recited above, the invention has for further objects such other improvements or advantages in operation and results as are found to obtain in the apparatus and process hereinafter described or claimed.

In the accompanying drawings, forming a part of this specification, and showing for purposes of exemplification preferred forms and manners in which the invention may be embodied and practiced, but without limiting the claimed invention specifically to such illustrative instance or instances:

Figure 1 illustrates a diagrammatic representation of apparatus for carrying out the improved gas purification process of the present invention; and Fig. 2 illustrates a modified form of apparatus hereinafter more fully described.

In its present embodiment, the invention is applied to the purification of coke oven gas, and for convenience, the present description will be confined to this use of the invention. The features of the invention are, however, susceptible of other valuable applications, for example to other gases; consequently the scope of the invention is not confined to the specific use and embodiment herein described as an illustrative example.

For effecting the absorption of such substances as carbon dioxide, hydrogen sulphide and cyanogen bearing compounds from the gas, in accordance with the invention, there is employed a water solution containing both an alkali metal carbonate and a bicarbonate. The carbonates and bicarbonates of the alkali earth metals may also be employed in solution or suspension, with or without admixture of alkali metal carbonates and bicarbonates. I have discovered, for example, that a solution of sodium carbonate-bicarbonate mixture is especially suitable for effecting the absorption of the above mentioned compounds from the gas because of the fact that the foul sodium carbonate-bicarbonate solution containing the absorbed impurities may be treated to expel these impurities and may be restored, after cooling, substantially to its original condition, without the formation of inert substances such as sodium thiosulphate ($Na_2S_2O_3$), which have no value as absorbents and thus would involve only a waste of soda. Preferably, the purifying agent consists of a water solution of the carbonate and bicarbonate of sodium, which, when the absorbed impurities have been driven off is in substantial equilibrium with the solution entering the gas washer. The ratio of sodium carbonate to sodium bicarbonate in the solution used for washing the gas is determined by the length of time required to expel the impurities, such as hydrogen sulphide, in the regeneration operation. For example, a solution of sodium carbonate-bicarbonate mixture that has been used for the treatment of gas containing approximately 1 percentum of hydrogen sulphide and 2 percentum of carbon dioxide requires heating for about 15 minutes at 80° C., in order to expel the hydrogen sulphide to a sufficient extent to restore the solution to its original absorbing capacity. In such a case, therefore, the gas purification process will be started with a solution of sodium bicarbonate that has first been heated for about 15 minutes at 80° C. and then cooled to the washing temperature before being allowed to enter the gas washer. Assuming that the solution, before heating, contains 5 percentum sodium bicarbonate, the heating is effected to convert approximately 8 percentum of the sodium bicarbonate to sodium carbonate. The percentage of bicarbonate converted into carbonate becomes less in more concentrated solutions, although the total amount converted may be greater. For example, if the original sodium bicarbonate solution be a 10 per cent solution, approximately 7 percentum of this is converted into sodium carbonate by heating at 80° C. for 15 minutes. If desired, the sodium carbonate-bicarbonate solution may be prepared by dissolving in water sodium carbonate and bicarbonate in such proportions as are required to give the necessary composition of the solution. Again, the purification operation may be started with a sodium carbonate solution and circulated through the system until enough carbon dioxide has been absorbed to give the solution the desired composition. However the solution of sodium carbonate-bicarbonate mixture be obtained, it is of primary importance to adjust the composition of the solution so that it corresponds to the composition obtained by heating for a sufficient length of time to expel the hydrogen sulphide. If then this time of heating during the regeneration operation is always maintained the same and the gas is fairly uniform with respect to its content of carbon dioxide, hydrogen sulphide and hydrocyanic acid, a condition of equilibrium will be maintained in the solution entering the gas washer. It is desirable to maintain the concentration of the solution not less than 5 to 6 percentum sodium carbonate (calculating the total alkali metal carbonate as such), the upper limit corresponding to the saturation point of the solution of sodium carbonate-bicarbonate mixture at the highest temperature at which the washing operation is conducted.

When a solution of sodium carbonate-bicarbonate, such as mentioned above, is brought into contact with the fuel gas to be purified, the following reactions occur:

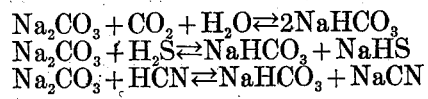

There is an excess of sodium carbonate in the solution before it is brought into contact with the gas and consequently, after the above mentioned reactions have taken place, the solution is composed of a mixture of sodium carbonate, sodium bicarbonate, sodium sulphydrate and sodium cyanide. By subjecting the solution containing the absorbed impurities to heat, the solution is decomposed according to the following equations which are the reverse of the equations of absorption:

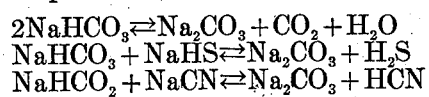

The amount of carbon dioxide present in the gases driven off during the decomposition of the foul solution varies according to the amount of carbon dioxide absorbed. Normally, however, the quantity of carbon dioxide is at least two or three times that of the absorbed hydrogen sulphide and hydrocyanic acid. The partial pressure of carbon dioxide over that in the original gas has, therefore, been considerably increased and consequently the carbon dioxide assists the liberation of $H_2S$ and $HCN$ by reacting with these substances to form sodium bicarbonate, according to the following equations:

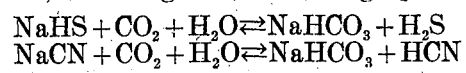

The bicarbonate formed in the absorption of carbon dioxide from gas is thus decomposed into carbonate and carbon dioxide and the liberated carbon dioxide again reacts with the sodium sulphydrate and sodium cyanide to form other sodium bicarbonate. Part of this formed sodium bicarbonate is decomposed during the travel of the solution through the heating apparatus, and the rejuvenated solution when it finally leaves the heating apparatus has substantially the same composition and proportionate amounts of sodium carbonate and bicarbonate as that of the solution before subjecting the gas to the absorption operation.

In applying the above stated discovery to the absorption of carbon dioxide, sulphur, and cyanogen bearing compounds from fuel gases, such as coke oven gas, the cooled gas after having been subjected to the usual tar and ammonia recovery processes is passed through a gas line 1 (see Fig. 1) into a tower or scrubber A in which it flows in counter current with the solution of sodium carbonate-bicarbonate mixture supplied to such scrubber through the solution line 2. In the tower or scrubber A considerably more carbon dioxide than hydrogen sulphide and hydrocyanic acid is absorbed and the gas is consequently freed of a large proportion of its carbon dioxide content. From the scrubber A the gas passes through another gas line 3 to a second scrubber B in which the gas flows in counter current with fresh solution of sodium carbonate-bicarbonate mixture. Here there is but relatively little conversion of sodium carbonate into sodium bicarbonate because of the previous absorption of carbon dioxide from the gas from the scrubber A, and practically all of the sodium carbonate in the solution is available for the absorption of the hydrogen sulphide and the hydrocyanic acid. The washing solution which enters the scrubber B is supplied through a solution line 4 and the purified gas discharges through a discharge line 5. The solution supplied to both scrubbers A and B is derived from a common solution tank C and the supply line 6 from said tank C is connected at a point 7 with the solution lines 2 and 4 of the respective scrubbers A and B. Pumps E and F in said supply lines 2 and 4 maintain a circulation of the solution through the scrubbers A and B.

From the scrubbers A and B the solution discharges through discharge lines 8 and 9 both of which are connected with a common discharge line 10 which leads to the foul solution tank D. The foul solution discharges from the tank D into a foul solution line 11 and is pumped through said line 11 by a pump G into an indirect preheater H in which it passes in counter-current with regenerated solution conveyed through the regenerated solution line 12 from the boiler or still K. The preheated foul solution from the preheater H discharges through a foul solution line 13 into the top of a tower or still solumn I. This still column is of the wellknown type with bubbling sections for counter current steam distillation, such as is used for the distillation of ammonia liquor. Thence the solution gravitates into the boiler or heater K. In the boiler K the foul solution is passed in contact with the steam coils L and is heated thereby to or near the boiling point of the solution. The boiler K is divided into compartments by means of baffles O to ensure uniform travel of the solution. The heating of the solution in the boiler K is effective to cause its decomposition according to the equations stated above and the gases of decomposition containing carbon dioxide together with hydrogen sulphide and hydrocyanic acid discharge through the top of the tower I. The gases may be conveyed to a burner for combustion of the hydrogen sulphide to elemental sulphur or sulphur dioxide. The decomposition of the foul solution in the tank K requires approximately 15 minutes and when effected, the regenerated solution of sodium carbonate-bicarbonate mixture is pumped by a pump M through a solution line 12 to the preheater H in which it is cooled during its passage in counter-current with the foul solution supplied by the foul solution line 11. Thence the regenerated solution discharges through cooling coils N in which it is further cooled and finally passes through the solution line 15 to the solution tank C for subsequent separate delivery to the scrubbers A and B in which the regenerated solution is again used in the absorption operation.

Instead of dividing the solution from the tank C into two parts, as above described, and causing it to flow in parallel through the scrubbers A and B the solution may be passed in series through said scrubbers. For this purpose, a by-pass 16 connects the solution line 2 with the discharge line 9, said by-pass being provided with a valve $a$. There is also a valve $b$ in the line 7 below the by-pass 16 and a valve $c$ in the discharge line 9 of the scrubber B. By closing the valves $c$ and $b$, the solution may be first circulated through the scrubber B in which it comes in contact with the gases containing the least carbon dioxide and thence passes from the scrubber B into the scrubber A where the major portion of the carbon dioxide absorption is effected. Thus the fresh solution, which contains more carbonate available for the absorption of hydrogen sulphide and hydrocyanic acid is brought first into contact with the gas in the second tower B, which gas has already been subjected to a carbon dioxide absorbing operation in the first tower A.

When purifying gases containing little or no carbon dioxide, a portion of the solution may be passed into contact with stack gases, which are rich in carbon dioxide, in order to absorb the amount of carbon dioxide necessary to effect the decomposition reaction in the heater or boiler K. If stack gases are employed for this purpose, it is preferable to first remove the sulphur dioxide from such gases.

Referring to Fig. 2 the revivified solution from the tank C is pumped from the solution line 6 by means of a pump P into separate solution lines 2 and 4, one solution line 2 leading to the top of the tower or scrubber A in which the fuel gas is purified, and the other solution line 4 leading to the top of a tower or scrubber W into which furnace gases containing $CO_2$ are introduced. The solutions coming from the two scrubbers A and W by way of the solution lines 8 and 9 and the common solution line 10 are mixed in the collecting tank D. The distribution of solution into the two scrubbers and the admission of furnace gases into scrubber W are adjusted in such a way that sufficient excess sodium bicarbonate is contained in the mixed solution in the collecting tank to effect the reactions in the solution regeneration operation, as well as to maintain the proper proportion of sodium bicarbonate in the solution entering the scrubber A. Otherwise the process is carried on in exactly the same manner as has been described in connection with Fig. 1.

In each of its forms, the invention excludes the outside air entirely from contact with the solution of sodium carbonate-bicarbonate mixture. Consequently no oxygen, except the slight traces that may be present in the gas to be purified, can come into contact with the solution. By preventing access of the solution to free oxygen or air, the formation of sodium thiosulphate is prevented. This is an important advantage, for the reason that the formation of sodium thiosulphate involves a waste of soda, thiosulphate being so much inert material. The invention thus accomplishes a substantially complete conservation of the gas purifying solution.

The invention as hereinabove set forth may be variously embodied within the scope of the claims hereinafter made.

I claim:

1. In a process for purifying gases, the combination of steps that consists in: passing the gas through a solution of an alkali metal carbonate-bicarbonate mixture to absorb the impurities from the gas, subjecting the solution containing the absorbed impurities to heating to remove such impurities from and to effect a regeneration of such solution, and utilizing the rejuvenated solution for further gas purification; substantially as specified.

2. In a process for purifying fuel gas, the combination of steps that consists in: passing the gas through a solution of sodium carbonate-bicarbonate mixture to absorb the impurities from the gas, subjecting the solution containing the absorbed impurities to heating to remove such impurities from and to effect a regeneration of such solution, and utilizing the rejuvenated solution for further gas purification; substantially as specified.

3. In a process of purifying gas, the combination of steps that consists in: passing the gas through a solution of an alkali metal carbonate-bicarbonate mixture to absorb the impurities from the gas, then heating the solution containing the absorbed impurities to expel such impurities and continuing the heating until the rejuvenated solution is in substantial equilibrium with the solution going to the gas purification operation, and utilizing the so rejuvenated solution for further gas purification; substantially as specified.

4. In a process of purifying fuel gas, the combination of steps that consists in: passing the gas through a solution of sodium carbonate-bicarbonate mixture to absorb the impurities from the gas, then heating the solution containing the absorbed impurities to expel such impurities and continuing the heating until the rejuvenated solution is in substantial equilibrium with the solution going to the gas purification operation, and utilizing the so rejuvenated solution for further gas purification; substantially as specified.

5. In a process of purifying fuel gas, the combination of steps that consists in: passing the gas through a solution of an alkali metal carbonate-bicarbonate mixture to absorb the impurities from the gas, then expelling such impurities from the foul solution to effect a rejuvenation thereof, the rejuvenated solution being maintained in substantial equilibrium with the solution going to the gas purification operation, and passing the rejuvenated solution to the gas purification operation; substantially as specified.

6. The improved gas purification process consisting in maintaining a continuous circulation of a solution of an alkali metal carbonate-bicarbonate mixture in contact with the gas to purify the latter and thence to a heating operation, combined with continuous cooling and recirculation of the solution back to the gas purification step; substantially as specified.

7. The improved gas purification process consisting in maintaining a continuous circulation of a solution of an alkali metal carbonate-bicarbonate mixture in contact with the gas to purify the latter and thence to a heating operation, combined with continuous cooling and recirculation of the solution back to the gas purification step, the entire volume of solution in circulation being substantially free from contact with free oxygen; substantially as specified.

8. In a process of purifying fuel gas, the combination of steps that consists in: first passing the gas through a solution of an alkali metal carbonate-bicarbonate mixture to absorb the carbon dioxide from the gas, then subjecting the gas to a further absorption process with alkali carbonate-bicarbonate solution to remove from the gas the hydrogen sulphide and cyanogen bearing compounds, collecting the solution from both absorption steps and subjecting it to heat to remove the impurities from and effect a regeneration of such solution; and utilizing the rejuvenated solution for further gas purification; substantially as specified.

9. In a process of purifying fuel gas, the combination of steps that consists in: first passing the gas through a solution of an alkali metal carbonate-bicarbonate mixture, to absorb the carbon dioxide from the gas, then subjecting the gas to a further absorption process with alkali carbonate-bicarbonate solution to remove from the gas the hydrogen sulphide and cyanogen bearing compounds, collecting the solution from both absorption steps and subjecting it to heat to remove the impurities from and effect a regeneration of such solution, the rejuvenated solution being in substantial equilibrium with the solution going to the gas purification operation, and utilizing the rejuvenated solution for further gas purification; substantially as specified.

10. In a process of purifying fuel gas, the combination of steps which consists in: subjecting the gas to two absorption steps, one principally for the absorption of carbon dioxide and the other principally for the absorption of hydrogen sulphide and cyanogen bearing compounds, by passing the gas in one stage through a solution of an alkali metal carbonate-bicarbonate mixture and in the other stage through fresh alkali metal carbonate and bicarbonate solution, collecting the solution from both such absorption stages and subjecting such solution to heat to remove the impurities from and effect a regeneration of the solution, and utilizing the rejuvenated solution for further gas purification; substantially as specified.

EDWARD VICTOR ESPENHAHN.